United States Patent [19]
Cotie et al.

[11] Patent Number: 5,929,968
[45] Date of Patent: Jul. 27, 1999

[54] SCLERAL-CORNEAL CONTACT LENS

[76] Inventors: Robert L. Cotie, 128 Summit Cove, Trophy Club, Tex. 75229; Alan Hirshberg, 16807 Chepstow Ct., Dallas, Tex. 75248

[21] Appl. No.: 08/834,890

[22] Filed: Apr. 7, 1997

Related U.S. Application Data

[63] Continuation-in-part of application No. 08/548,290, Nov. 1, 1995, abandoned.

[51] Int. Cl.$^6$ .............................. G02C 7/04; G02C 7/02
[52] U.S. Cl. ...................................... 351/160 R; 351/177
[58] Field of Search ........................... 351/160 R, 160 H, 351/161, 162, 177

[56] References Cited

U.S. PATENT DOCUMENTS

| | | | |
|---|---|---|---|
| 2,164,801 | 7/1939 | Dittmer | 88/54 |
| 2,641,161 | 6/1953 | Silverstein | 88/54.5 |
| 3,246,941 | 4/1966 | Moss | 351/160 |
| 3,495,899 | 2/1970 | Biri | 351/160 |
| 4,194,815 | 3/1980 | Trombley | 351/160 R |
| 4,601,556 | 7/1986 | Siviglia | 351/160 R |
| 4,895,439 | 1/1990 | Stoller | 351/167 |
| 4,952,045 | 8/1990 | Stoyan | 351/160 R |
| 4,997,268 | 3/1991 | Dauvergne | 351/159 |
| 5,020,898 | 6/1991 | Townsley | 351/160 R |
| 5,141,301 | 8/1992 | Morstad | 351/161 |
| 5,191,365 | 3/1993 | Stoyan | 351/160 R |
| 5,349,395 | 9/1994 | Stoyan | 351/161 |

OTHER PUBLICATIONS

Arons et al., "The Mueller-Welt Legacy," *Contact Lens Spectrum*, Jul. 1987, pp. 8–20.

*Primary Examiner*—Georgia Epps
*Assistant Examiner*—Jordan M. Schwartz
*Attorney, Agent, or Firm*—Jenkens & Gilchrist, P.C.

[57] ABSTRACT

A contact lens is formed of rigid gas permeable material and covers the cornea and a small adjacent portion of the sclera of an eye. The posterior surface of the lens has a radially outer portion that generally conforms with the shape of the ocular surface in the scleral region. The posterior surface of the lens covering the corneal region of the eye is selectively spaced from, aligned with, or in eyelid bearing pressure contact with, the corneal region of the eye, whereby the eyelid bearing pressure is controllably distributed over both the scleral and corneal regions of the eye. The contact lens is comfortable to wear, not prone to unintended dislodgement during periods of physical activity, and can be worn after surgical treatment of the cornea and is thinner and much smaller than previous scleral contact lenses.

11 Claims, 4 Drawing Sheets

SCLERAL-CORNEAL CONTACT LENS

CROSS-REFERENCE TO RELATED APPLICATION

This is a continuation-in-part of application Ser. No. 08/548,290, filed Nov. 1, 1995 now abandoned.

FIELD OF THE INVENTION

This invention relates generally to contact lenses, and more particularly, to rigid gas permeable contact lenses that extend over the corneal and a small portion of the sclera of an eye.

BACKGROUND ART

The prior art is replete with innovations in contact lens designs. One such innovation is the rigid gas permeable (RGP) contact lens. This optical device has been successfully used in corneal lens to provide visual corrections of hyperopia, presbyopia, and myopia. The lenses have also been used for limited corneal molding. Examples of such applications are described in U.S. Pat. Nos. 4,952,045, 5,192,365 and 5,349,395 issued to Nick Stoyan. Many disadvantages still exist, however, with conventional contact lens designs. Corneal lens, for example, are generally prone to dislodgement from the eye if the wearer is subjected to sharp changes in motion, as often encountered during participation in sports and other physical activities. Dislodging of the lens can be both uncomfortable and dangerous.

Another type of lens is the scleral contact lens. A scleral lens covers most of the sclera and all of the cornea of the eye. Additionally, the scleral lens is wholly supported by the scleral portion of the eye and vaults the cornea to provide a cavity for tears or a tear substitute. These lenses have been conventionally formed of blown glass and have been relatively thick, being on the order of 2.0 to 3.0 mm thick. The concave, or posterior, surface of the lenses had two primary areas of curvature, the first being an outer peripheral area that approximated the scleral curvature, and the other being a central curved area that vaulted the cornea by as much as 2.0 mm providing a chamber that was filled with a tear substitute. The convex, or anterior, surface of the lens had a contour approximating that of the inner surface except in the center which was ground to provide optical correction. In addition to being thick, scleral lenses are also relatively large, having a typical diameter of about 25 mm, often causing eye irritation if worn for more than several hours.

Prior art scleral contact lenses have also been manufactured of plastic materials based on a casting of the eye. In this arrangement, the center of the lens has minimal vaulting and does not require a tear substitute. However, the diameter and thickness of the lens is virtually the same as the above mentioned glass, and similar glass-plastic composite lenses.

Plastic scleral contact lenses were also produced by lathing and polishing a plastic preform. The concave surface contained at least two, and as many as 10, curves to approximate the shape of the eye. These designs produced a relatively thinner lens (albeit still very thick by today's standards) with little or no clearance in the scleral area and little to extreme clearance in the corneal area. While some of the above designs were considered improvements over earlier lenses, the ability to wear scleral contact lenses has, heretofore, been very limited, both as to wearing time and in the number of patients able to tolerate them.

One attempt to provide a smaller diameter contact lens is described in U.S. Pat. No. 4,194,815 issued Mar. 25, 1980 to Wayne E. Trombley for a SEMI-SCLERAL CONTACT LENS. The Trombley lens is aligned with, i.e., contacts, the central corneal area of an eye, then vaults the limbus and a portion of the scleral area of the eye before coming down and making contact, at the very outer peripheral area of the lens, with the sclera. Thus, the Trombley lens vaults all of the eye area between the central cornea and a point contact line on the sclera. If formed of a rigid material, a possibility suggested by Trombley, the very small bearing surface on the sclera would be very uncomfortable and would permit the lens to move, particularly in the up and down directions, creating displacement of the lens' curvature at the center. In order to avoid adverse movement of the lens in view of the small scleral bearing area, the teaching in Trombley is obviously only applicable to a pliable lens in which the sagittal depth is not critical.

The present invention is directed to solving the problems set forth above. It is therefore desirable to have a contact lens that conforms with the limbus and a small portion of the sclera to provide a distributed outer bearing area for the lens, and extends under a portion of the eyelid so that the lens is not easily dislodged, such as is often the case with corneal contact lenses. It is also desirable to have a contact lens that is relatively thin, comfortable to wear, and easy to insert and remove. Furthermore it is desirable to have a contact lens that can be worn after corneal surgery, such as keratotomy, in cases where the surgical procedure was not completely successful in achieving the desired visual acuity. Still further, it is desirable to have a contact lens that can mold the cornea to a desired shape by controllably distributing the bearing pressure of the eyelid on both the corneal and scleral portions of the eye.

DISCLOSURE OF THE INVENTION

In accordance with one aspect of the present invention, a contact lens is formed of a rigid gas permeable material and has a posterior surface comprising first, second and third portions. A first portion of the posterior surface is shaped to contact a first predetermined area of the corneal surface of the eye. A second portion of the posterior surface is adapted to be spaced from a second corneal surface of the eye, and a third portion of the posterior surface is adapted to abut a predetermined area of the limbus and scleral surfaces of the eye.

Other features of the contact lens embodying the present invention include the first and third portions of the posterior surface cooperating to controllably distribute the eyelid bearing pressure over the limbus and sclera, and over a portion of the cornea when the eyelid is moved over the lens.

In another aspect of the present invention, a contact lens is formed of a rigid gas permeable material and has a central portion adapted to be optically aligned with the lens of an eye, an intermediate portion adapted to be positioned over the corneal portion of the eye surrounding the lens of the eye, and a peripheral portion adapted to be positioned over the limbic and scleral portions of the eye. The medial radius of curvature of the intermediate portion of the posterior surface of the lens is greater than that of the central portion, and the medial radius of curvature of the peripheral portion of the posterior surface is greater than that of the intermediate portion.

In another aspect of the present invention, a contact lens has a posterior surface defined by five concentrically disposed zones extending from the sclera to the center of the cornea. The zones are selectively curved so that eyelid bearing pressure is controllably distributed over a small portion of the limbus and sclera, and over one or more corneal regions of the eye.

In yet another aspect of the present invention, a method for controllably altering the predefined shape of the cornea of an eye to reduce hyperopia includes disposing a rigid, gas permeable, contact lens on the eye. The contact lens has a posterior surface comprising a first portion adapted to be spaced from a first predetermined surface of the cornea, a second portion adapted to controllably abut a second predetermined surface of the cornea, a third portion adapted to be spaced from a third predetermined surface of the cornea, a fourth portion adapted to controllably abut or align with the limbus of the eye and a fifth portion adapted to controllably abut a predetermined surface of the sclera of the eye. Pressure is applied to the predefined surface of the cornea by pressing the second portion of the posterior surface of the lens against the second predetermined surface of the cornea in response to normal movement of an eyelid over the lens.

In still another aspect of the present invention, a method of providing optical correction for an eye subsequent to surgical treatment of a defined portion of the cornea of the eye includes placing a rigid, gas permeable, contact lens on the eye. The contact lens has a central area that is adapted to be optically aligned with the lens of the eye and provide optical correction to light passing through the eye lens and has a posterior surface in substantial abutment with a corresponding predefined surface of the cornea. The lens also has an intermediate portion surrounding the central portion that has a posterior surface that is spaced from the surface of the surgically treated portion of the cornea, and a peripheral portion that has a posterior surface in substantial abutment with a predetermined surface area of the sclera of the eye. The central and peripheral portions of the posterior surface cooperate to controllable distribute the bearing pressure imposed on the lens by an eyelid when the eyelid is moved over the anterior surface of the lens.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

BEST MODE FOR CARRYING OUT THE INVENTION

Figure 1:
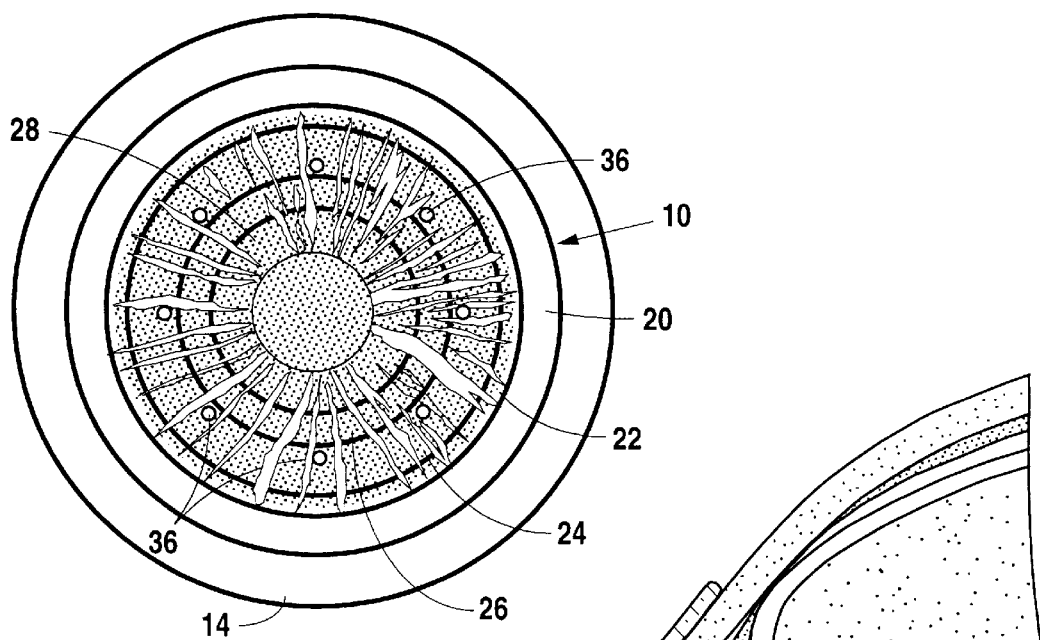
FIG. 1 is a frontal view of the preferred embodiment of the contact lens embodying the present invention, showing the lens in the normal wearing position over the cornea, limbus, and a small portion of the sclera of the eye.
Figure 2:
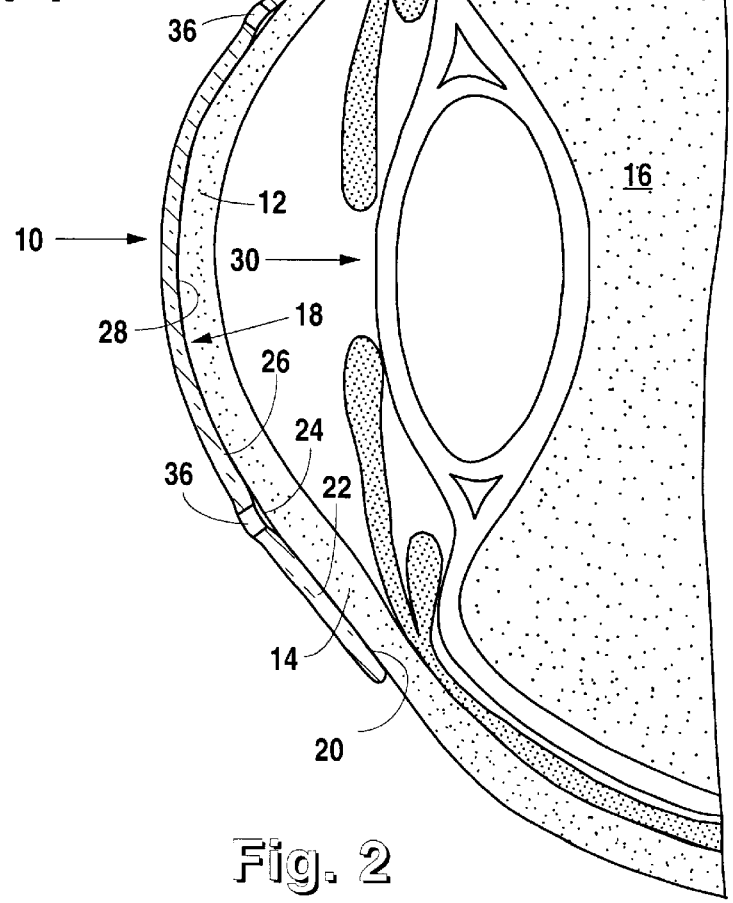
FIG. 2 is a cross-sectional view of the frontal portion of an eye showing the preferred embodiment of the contact lens embodying the present invention in the normal wearing position over the cornea, limbus, and a small portion of the sclera of the eye.

Referring first to FIGS. 1 and 2, there is shown a contact lens 10 embodying the principle of the present invention. The lens 10 extends over both the cornea 12 and a contiguous portion of the sclera 14 of an eye 16, and is constructed of a rigid, gas permeable (RGP) material, which will allow the cornea to breath (the exchange of oxygen and carbon dioxide). Materials suitable for this purpose include, but are not limited to, products marketed under the following brand names: Boston 7, Boston RXD, FluroPerm 30, Paraperm 02, Fluorex 300. The contact lens 10 has ocular bearing areas on the limbus, a small portion of the sclera 14, and a selected area of the cornea 12 so that, when the eyelid is moved across the lens, such as by blinking, the eyelid bearing pressure is controllably distributed over the scleral and the corneal portions of the eye 16.

By selective arrangement of the curvature of the posterior surface 18 of the lens 10 and the ocular bearing areas, as described below in greater detail, the eyelid bearing pressure can be advantageously used to controllably alter the predefined shape of the cornea, or alternatively vault surgically treated or diseased area of the corner.

In the preferred embodiment of the present invention, as shown in FIGS. 1–4, the posterior surface 18 of the scleral-corneal contact lens 10 is defined by five concentrically disposed ocular zones. The outermost zone is disposed over the scleral portion of the eye and is referred to herein as the scleral zone 20, and has a radial width of from about 1.0 mm to about 2.0 mm which provides a stable, load-distributing, scleral footing for the lens 10. In marked contrast, scleral lenses typically cover a radial width of as much as 5 mm or 6 mm of the scleral region of the eye and are difficult to insert and remove. In the lens 10 embodying the present invention, the next zone inwardly from the scleral zone 20 is approximately aligned with the limbus of the eye, i.e., the border that is clearly defined between the cornea and the sclera of the eye, and for descriptive purposes will be referred to herein as the limbic zone 22. The next zone inwardly from the limbic zone 22 is positioned near the outer edge of the cornea and is identified herein as the peripheral-corneal zone 24. The mid-corneal zone 26 extends concentrically between the peripheral-corneal zone 24 and the central-corneal zone 28 at the center of the lens 10. The central-corneal zone 28 has a diameter that approximates the diameter of the pupil of the eye 16 when fully dilated, and is the area combined with the opposed anterior surface of the lens that is ground to provide optical correction of light passing through the cornea to the lens 30 of the eye 16.

The curvature of each of the zones may selectively be spherical, aspherical, flat angles, or a combination of all three, and are progressively less steep, i.e., have a larger medial radius of curvature, from the central-corneal zone 28 to the outer scleral zone 20. The term "medial radius of curvature" as used in the following description and claims means the radius of curvature at the midpoint of the referenced surface. The specific sagittal depth of each of the zones is selectively altered by steepening or flattening the curvature of the related zone. Thus, the location and surface area of the ocular bearing areas can be arranged, as described below, to control the amount, or absence, of corneal molding at particular locations on the cornea 12. Importantly, in the present invention an ocular bearing area is provided in the scleral zone 20 and the limbic zone 22, and in at least one other zone disposed over the cornea 12, so that the eyelid bearing pressure is controllably distributed over both the limbus and the sclera 14 and cornea 12 of the eye 16. This not only makes the lens more comfortable for the wearer, but enables the bearing areas to be distributed so as to control the amount, or absence, of corneal molding. This also makes it possible to keep the lens diameter much smaller, e.g. on the order of from about 12 mm to about 16 mm, and the thickness much thinner than any previous rigid scleral contact lens.

If it desired to maintain the predefined shape of the cornea 12, the posterior surface of the scleral zone 20 and the limbic zone 22 of the lens 10 desirably have curvatures that are aligned with the surface of the eye 16 over the limbus and the sclera 14, whereby a portion of the eyelid pressure is evenly distributed over those portions of the eye 16. The peripheral-corneal zone 24 is desirably vaulted so that no pressure is applied to surface of the eye 16 in that region. The mid-corneal zone 26 is either aligned or slightly vaulted so that, respectively, either uniform or no pressure is applied to the corresponding eye surface. The posterior surface of the central-corneal zone 28 of the lens 10 should be aligned with the flattest corneal meridian of the corresponding eye surface so that the distributed portion of ocular bearing pressure is substantially equally applied over the central portion of the cornea.

In all of the described embodiments of the present invention, the defined zonal curvatures are aligned and blended so that the overall sagittal height of the posterior surface of the lens 10, i.e., the height of the curve at the midpoint of a chord extending diametrically across the outer edge of the lens, approximates the sagittal depth of the corresponding ocular surface of the eye 16 over which the lens 10 is disposed. The curvatures shown in the drawings are exaggerated for purposes of discussion and identification, and do not have the sharp cusps between adjacently disposed zones as illustrated.

If it is desired to flatten the cornea 12 in its central region, posterior surface of the lens 10 the scleral and limbic zones 20, 22 should be aligned with the eye surface, and the peripheral-corneal zone 24 vaulted as above. However, to increase bearing pressure in the central-corneal zone 28, the mid-corneal zone 26 is also vaulted, and the central-corneal zone 28 is flatter than the central area of the cornea 12. In this arrangement, the overall sagittal height of the posterior surface of the lens 10 is less than the sagittal depth of the covered ocular surface.

To steepen the central corneal shape, the scleral and limbic zones 20, 22 are aligned with the corresponding ocular surfaces 22 and peripheral-corneal zone 24 is vaulted over the corresponding ocular surfaces as in the earlier described arrangements. However, in this arrangement, the mid-corneal zone 26 is misaligned with the ocular surface to impose pressure on the corresponding surface, whereas the central-corneal zone 28 is vaulted. In this configuration, the overall sagittal height of posterior surface of the lens 10 is greater than the corresponding depth of the ocular surface.

Figure 5:
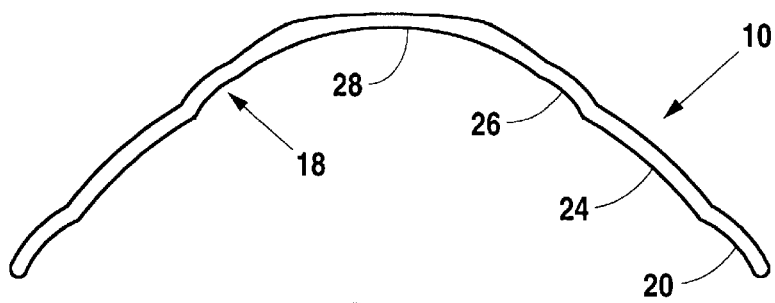
FIG. 5 is a cross-sectional view of an alternate embodiment of the contact lens embodying the present invention, with the radius of curvature on four different portions of the posterior surface exaggerated for illustrative purposes.

In other configurations, the lens 10 embodying the present invention may have more or less than the five ocular bearing zones described above. For example, as shown in FIG. 5, the posterior surface of the lens 10 may comprise four ocular bearing areas. In the arrangement, the scleral zone 20, the mid-corneal zone 26, and the central-corneal zone 28 are constructed essentially as described above in the five zone arrangement, with a single peripheral-corneal zone 24 replacing the limbic zone 22 and extending between the scleral zone 20 and the mid-corneal zone 26.

Figure 6:
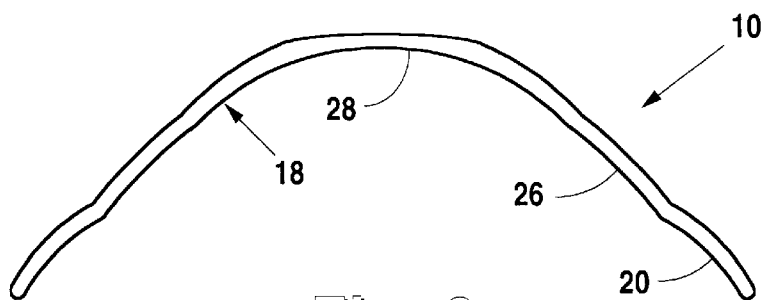
FIG. 6 is a cross-sectional view of an alternate embodiment of the contact lens embodying the present invention, with the radius of curvature on three different portions of the posterior surface exaggerated for illustrative purposes.

In yet another arrangement, the posterior surface of the lens 10 embodying the present invention may be defined by three ocular bearing zones as illustrated in FIG. 6. In this arrangement, the scleral zone 20 is somewhat widened so that it extends over the limbus of the eye 16, and a single mid-corneal zone 26 extends between the scleral zone 20 and the central-corneal zone 28.

Figure 7:
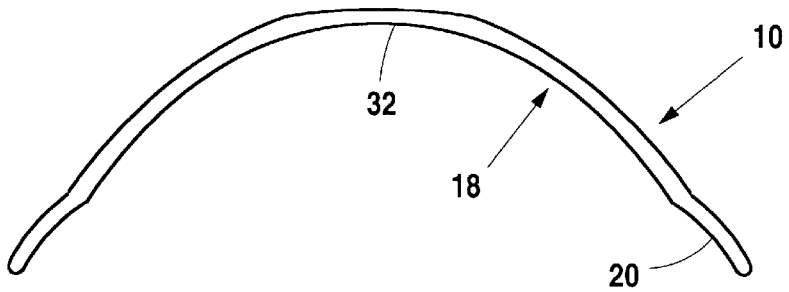
FIG. 7 is a cross-sectional view of an alternate embodiment of the contact lens embodying the present invention, with the radius of curvature on two different portions of the posterior surface exaggerated for illustrative purposes.

The posterior surface of the lens 10 embodying the present invention may also be considered as comprising two ocular bearing zones as shown in FIG. 7. In this arrangement, the scleral zone 20 is essentially as described in the five zone arrangement, and the remaining portion of the posterior surface 18 of the lens 10 is a continuous aspheric surface 32 with varying radii of curvature along the surface as described in the above table for five zones.

Figure 8:
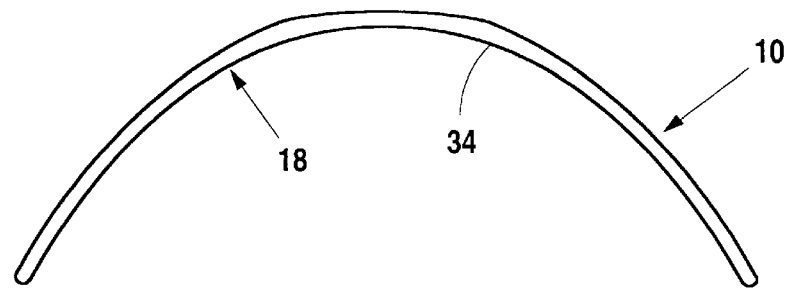
FIG. 8 is a cross-sectional view of an alternate embodiment of the contact lens embodying the present invention, showing the posterior surface as a single, continuously-curved, aspheric surface.

The posterior surface 18 may also be considered as a single aspheric surface 34 having a smaller radius of curvature at the central-corneal zone 28 than at the outer scleral zone 20, as shown in FIG. 8.

Regardless of the number and specific placement of defined ocular bearing zones, the lens 10 embodying the present invention may be envisioned as having a posterior surface 18 with three essential portions: a first portion adapted to abut a first predefined area of the cornea 12, a second portion adapted to be spaced from, a second predefined area of the cornea 12, and a third portion adapted to abut a predetermined surface area of the sclera 14 and limbus of the eye 16. The second portion, adapted to be spaced from the ocular surface of the cornea 12, generally corresponds to the peripheral-corneal zone 24 in the above described three zone arrangement of the lens 10. If it is desired to flatten the predefined shape of the cornea 12, the first portion may also include the mid-corneal zone 26. If the intent is to steepen the shape of the cornea 12, the central-corneal zone 28 is vaulted, or spaced from, the ocular surface.

The second portion of the posterior surface, in abutting contact with the ocular surface of a second predefined area of the cornea 12, usually comprises the central-corneal zone 28, and optionally all or a portion of the mid-corneal zone 26 if it is desired to maintain the current corneal shape; all or a portion of the central-corneal zone 28 if it is desired to flatten the predefined shape of the cornea 12; and all or a portion of the midcorneal zone 26 if it is desired to steepen the shape of the cornea 12.

The third portion in abutting contact with the sclera 14 comprises the scleral zone 20 and the limbic zone 22 in all multi-zoned arrangements of the lens 10. In the single aspheric posterior surface arrangement illustrated in FIG. 8, the posterior surface 34 is shaped to abut the ocular surface of the cornea 12 in the regions generally corresponding the location of the described zones in the five zone arrangement, with the radially outer surface generally conforming with the sclera 14 the limbus. Thus, it can be seen that, when the posterior surface of the lens 10 is described as having three portions, that the first and second portions can be selectively arranged to affect the desired corneal molding. More specifically, the second portion is positioned to provide an ocular bearing pressure sufficient to controllably alter the corneal portion of the predefined surface of the eye in response to moving the eyelid over the eye, for example by normal blinking motions. Importantly, regardless of where the second zone is position, the eyelid bearing pressure is controllably distributed over a relatively small portion of the sclera 14, the limbus, and a portion of the cornea 12.

In the description and claims presented herein, it is understood that the frontal portions of the eye 16 are covered with a thin, normally clear, mucus tissue referred to as the conjunctiva and references herein to the "ocular surface", "scleral surface" or "corneal surface" include the overlying conjunctiva.

The posterior surface of the lens 10, embodying the present invention, may alternatively be described has having a central portion, corresponding to the central-corneal zone 28 in the five zone arrangement which is optically aligned with the lens 30 of the eye 16; an intermediate portion adapted to be positioned over the corneal portion of the eye 16 circumscribing the lens of the eye and generally corresponding to the mid-corneal zone 26 and the peripheral zone 24 in the four and five zone arrangements or, alternatively, the mid-corneal zone 26 of the three zone arrangement; and a peripheral portion adapted to be positioned over the limbus and the sclera 14 of the eye 16 corresponding with the scleral zone 20 and the limbic zone 22 of the five zone arrangement. When described in this manner, and in view of the above discussed progressively larger radius of curvature of the posterior surface from the center outwardly, it can be seen that the medial radius of curvature of the intermediate portion is greater than that of the central portion, and the medial radius of curvature of the peripheral portion is greater than that of the intermediate portion.

Also, it can be seen that the central, intermediate, and peripheral portions of the posterior surface of the lens 10 may comprise two substantially continuously curved aspheric surfaces 32,20 as shown is FIG. 7, or a single aspheric surface 34 as shown in FIG. 8.

Figure 3:
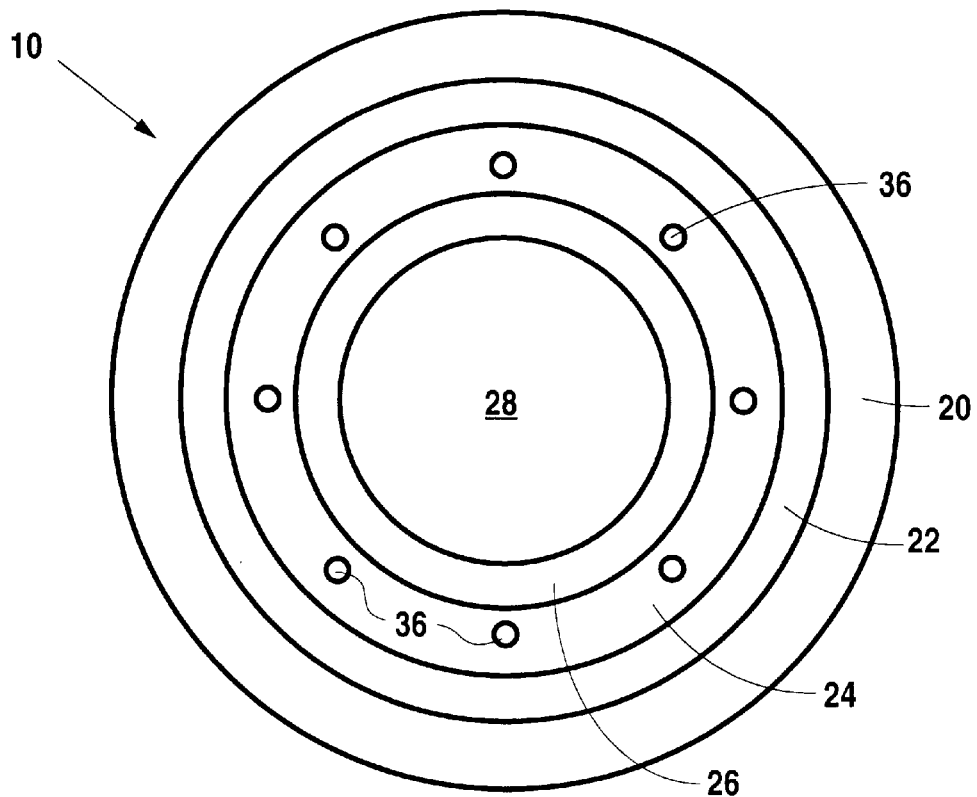
FIG. 3 is a frontal view of the contact lens embodying the present invention, as shown in FIGS. 1 and 2.
Figure 4:
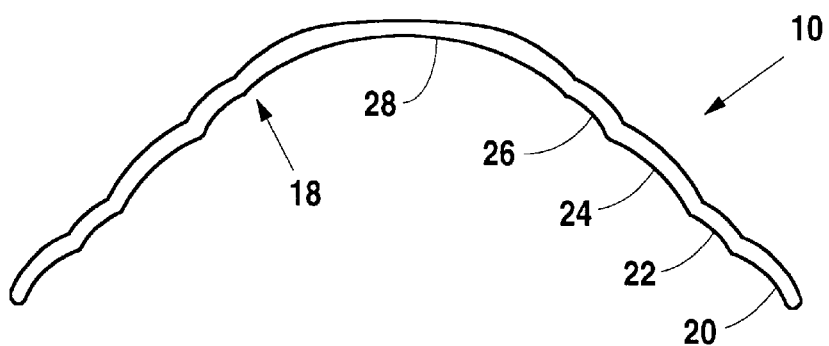
FIG. 4 is a cross-sectional view of the contact lens embodying the present invention, as shown in FIGS. 1, 2 and 3, with the radius of curvature on five different portions of the posterior surface exaggerated for illustrative purposes.

The contact lens 10 embodying the present invention, desirably also has a plurality of relatively small apertures 36 having a diameter of from about 0.02 mm to about 1.50 mm., and preferably about 1.0 mm, as shown in FIGS. 1 and 3. The apertures 36 are conventionally formed by laser drilling techniques. Although mechanical drilling and polishing are possible. The specific location, number and arrangement of the apertures 36 is a matter of choice, although they will typically extend from the posterior surface of the lens 10 in the region covering the cornea 12, and preferably a region that is spaced from the cornea 12. The apertures 36 advantageously provide vents to relieve capillary adhesion which may occur in certain surface interface relationships between the ocular surface of the eye 16 and the lens 10.

Preferably, the anterior surface of the contact lens 10 embodying the present invention has a surface that generally conforms with the posterior surface of the lens 10 except for the central portion, or central corneal zone 28 which is typically ground to provide optical correction to light passing though the lens 30 of the eye 16. This arrangement also desirably distributes the eyelid bearing pressure over the limbic, scleral and central cornea regions of the eye 16. When shaped with a conforming anterior surface, the contact lens 10 embodying the present invention typically has a center thickness that is the same as a standard corneal RGP contact lens, i.e., from about 0.08 mm. to about 0.80 mm depending on correction, which is much thinner than any scleral lens. Alternatively, although generally forming a thicker lens 10, the anterior surface may comprise a single curved surface. Thickness is also a function of material stability.

Figure 9:
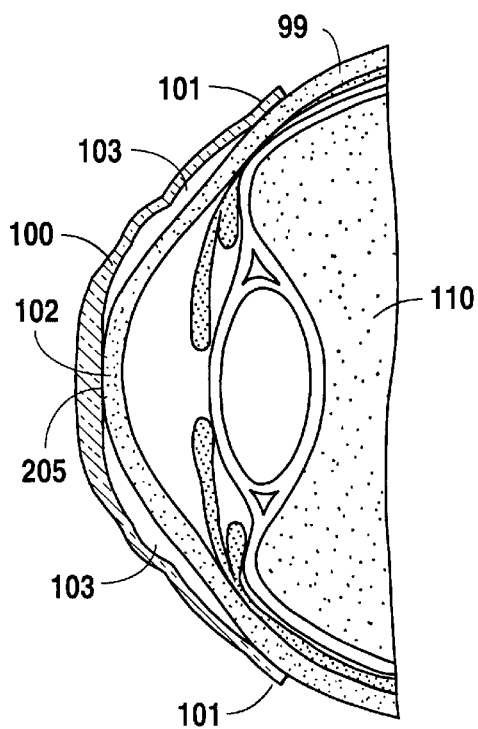
FIG. 9 is a cross-sectional view of the contact lens of FIG. 1, placed upon an eye in a configuration to controllably alter the predefined shape of the cornea of an eye to reduce myopia.

Referring now to FIG. 9, a cross-sectional view of the contact lens 10, embodying the present invention. is adapted to alter the shape of the cornea 12 to correct myopia. A contact lens 100 is shown placed upon an eye 110 with pressure points 101 established where the lens 100 contacts the sclera 99 of the eye 110. A vault 103 is defined beneath the lens 100 for affording movement of the cornea 102 into the vault 103 and ultimately against the curvature of the lens 100. The cornea 102 is engaged at point 105 by the lens 100 exerting pressure on the cornea 102. In this configuration, the lens 100 of the present invention is able to correct a myopic condition of the eye 110 and may provide molding of the cornea 102 for corrected vision, at least temporarily, after the lens 100 is removed from the eye 110.

Figure 10:
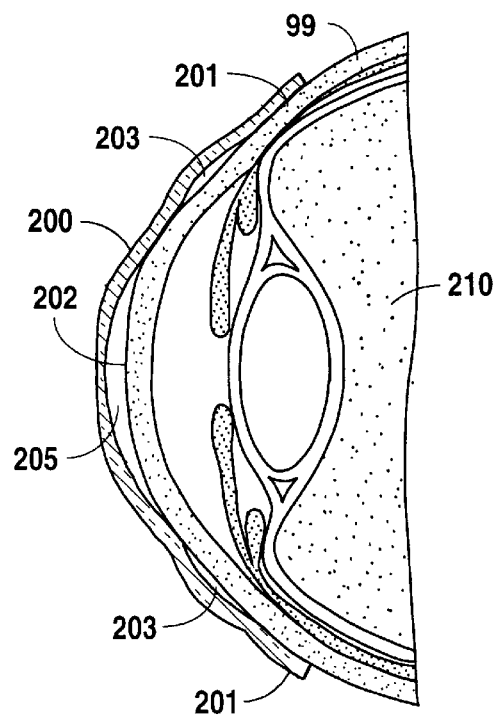
FIG. 10 is a cross-sectional view of the contact lens of FIG. 1, placed upon an eye in a configuration to controllably alter the predefined shapes of the cornea of an eye to reduce hyperopia.

Referring now to FIG. 10, a lens 200 illustrating another embodiment of the present invention, is placed upon an eye 210 to alter the predetermined shape of the cornea 202 and correct hyperopia. In this view, the eye 210 is contacted at point 201 on the sclera 99 whereat pressure is applied for support of the lens 200. Second contact points 203 establish pressure upon the cornea 202 with a region or vault 205 established for accommodating the corneal movement necessary for altering the shape of the cornea 202. As described in FIG. 9, removal of the lens 200 after prolonged wearing upon the eye 210 will result in temporary correction of hyperopia as the cornea 202 moves into the vault 205.

Figure 11:
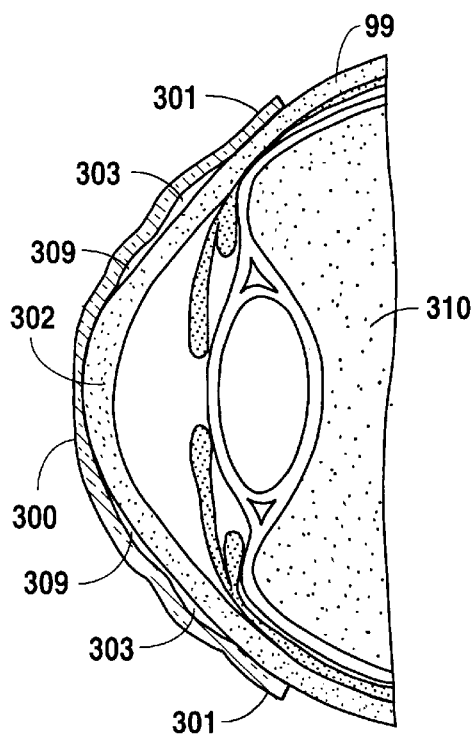
FIG. 11 is a cross-sectional view of the contact lens of FIG. 1, placed upon an eye which is to maintain the predefined shape of the cornea of the eye.

Referring now to FIG. 11, a contact lens 300, embodying the present invention, is placed upon an eye 310 which is not in need of corneal curvature change, or molding. In this view, it may be seen that the cornea 302 closely matches the contour of the lens 300, eliminating any vault for corneal movement, as is desirable when no corneal molding is needed. The lens 300 thus contacts the eye 310 at pressure points 301 on the sclera 99 and at pressure points 309 on the cornea 302. This minimal vault 303 above the cornea 302 is preferable because the cornea 302 has taken the appropriate shape for correct vision. Once the lens 300 is removed from the eye 310, vision will remain normal as long as the configuration of the cornea 302 remains conformed in the shape shown in FIG. 11.

Figure 12:
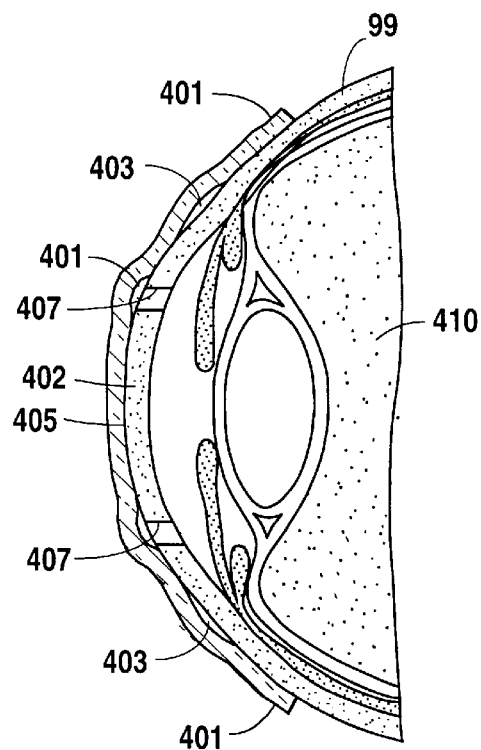
FIG. 12 is a cross-sectional view of the contact lens of FIG. 1, placed upon an eye in a configuration to accommodate post radial keratotomy.

Referring now to FIG. 12, there is shown a contact lens 400, embodying the present invention, that is placed upon an eye 410 after radial keratotomy. The cornea 402 has been slit, as illustrated by scars 407, resulting from the radial keratotomy surgery. The lens 400 engages the sclera 99 of the eye 410 at points 403 establishing pressure thereon for positioning the lens 400 relative to the eye 410. Additional light pressure is established between the lens 400 and the cornea 402 at points 401 adjacent the scars 407. A vault 405 is provided beneath the lens 400 above the cornea 402 to permit controlled movement of the cornea 402. The scars 407, resulting from the surgery on the cornea 402, may prevent its movement into the vault 405 as shown in FIG. 11.

INDUSTRIAL APPLICABILITY

In addition to providing a thin contact lens 10 that, because of its outer edge extending over the limbus and a small portion of the sclera, and therefore under the eyelids, is more comfortable for the wearer and the lens is not as easily dislodged than conventional corneal contact lens formed rigid gas permeable materials. Moreover, because of the controlled limbic and scleral footprint areas, a stable seat is provided which inhibits movement of the contact lens, and provides more stable vision correction than typical RGP lenses. Also, because of its rigid shape, the contact lens 10 embodying the present invention provides better visual acuity and is easier to clean and maintain than soft contact lens.

Importantly, as can be seen from a study of the above description and the drawings, the lens 10 embodying the present invention, is particularly beneficial in treating certain diseases, or abnormalities, of the eye in which it is desired to alter the predefined surface shape of the eye. Such treatment can be readily carried out using the contact lens 10 embodying the present invention in which selected portions, or areas, of the posterior surface of the lens can be constructed so that it controllably abuts or is spaced from selected areas of the cornea 12. Pressure against the ocular surface in the preselected bearing zones is advantageously provided by movement of the eyelid over the lens 10 while worn by the patient.

The lens 10 embodying the present invention is also useful for providing optical, or visual, correction for the lens 30 of the eye after surgical treatment, such as radial keratotomy. For example, when used after failed corneal surgery, or as an adjunct to partially successful surgery, the intermediate portion of the lens 10 is desirably spaced from the surgically treated corneal surface. The eyelid bearing pressure is controllably distributed over the scleral and central corneal surfaces. If it is desired to flatten the central corneal region, the corresponding area of the posterior surface of the lens 10 is desirably flattened, i.e., has a larger radius of curvature than the ocular surface of the central cornea.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications and substitutions without departing from the spirit of the invention as set forth and defined by the following claims.

What is claimed is:

1. A contact lens for an eye having a predefined surface, said lens being formed of a rigid gas permeable material and having a posterior surface comprising a first portion adapted to contact a first predetermined area of the corneal surface of said eye, a second portion adapted to be spaced from a second predetermined area of the corneal surface of said eye, and a third annular portion adapted to contact the limbus and predetermined area of the scleral surface of said eye, wherein said first and third portions of the posterior surface of said lens cooperate to equally distribute the eyelid bearing pressure over the limbus and predefined portions of the sclera and the cornea in response to moving the eyelid over said lens.

2. A contact lens, as set forth in claim 1, wherein the third portion of said lens is adapted to contact the limbus and an annular surface area of the sclera of the eye, said annular area having a radial width of from about 0.5 mm to about 2.0 mm.

3. A contact lens for an eye having a predefined surface, said lens being formed of a rigid gas permeable material and having a posterior surface comprising a first portion adapted to contact a first predetermined area of the corneal surface of said eye, a second portion adapted to be spaced from a second predetermined area of the corneal surface of said eye, and a third annular portion adapted to contact the limbus and predetermined area of the scleral surface of said eye, wherein said first and third portions of the posterior surface of said lens cooperate to equally distribute the eyelid bearing pressure over the limbus and predefined portions of the sclera and tube cornea in response to moving the eyelid over said lens, said third portion of the lens is adapted to contact the limbus and an annular area of the sclera of the eye, said annular area having a radial width of from about 0.5 mm, to about 2.0 mm, and the first portion of the posterior surface of said lens is shaped to contact the first predetermined area of the corneal surface of the eye with sufficient pressure to controllably alter the shape of said first predetermined area of the corneal surface of said eye in response to moving the eyelid over said lens.

4. A contact lens, as set forth in claim 3, wherein said lens has a center that, when the lens is operatively disposed on the eye surface, is adapted to be maintained at position over the pupil of said eye and a peripheral portion having a radial width of from about 0.5 mm to about 2.0 mm that is adapted to be maintained at a position over a portion of the sclera of said eye, and said second portion of the posterior surface of said lens is disposed over a peripheral area of the cornea.

5. A contact lens, as set forth in claim 3, wherein said lens has a center that, when the lens is operatively disposed on the eye surface, is adapted to be maintained at a position over the pupil of said eye and a peripheral portion having a radial width of from about 0.5 mm to about 2.0 mm that is adapted to be maintained at a position over a small portion of the sclera of said eye, and said second portion of the posterior surface of said lens is disposed at a position intermediate said center and said periphery of the lens.

6. A contact lens, as set forth in claim 3, wherein said third portion of the posterior surface of the lens is shaped to substantially conform with the predefined surface of the limbus and a portion of the sclera of said eye.

7. A contact lens, as set forth in claim 3, wherein the first, second, and third portions of the posterior surface of said lens are defined by a single, continuously curved, aspheric surface, said third portion having a larger radius of curvature than either of said first and second portions.

8. A contact lens, as set forth in claim 4, wherein said lens has a plurality of relatively small apertures extending from a selected one of said first and second portions of the posterior surface of said lens to an anterior surface of the lens.

9. A contact lens formed of a rigid gas permeable material and having a posterior surface comprising a central portion adapted to be optically aligned with the lens of an eye, an intermediate portion adapted to be positioned over the corneal portion of the eye circumscribing said lens of the eye, and a peripheral portion adapted to be positioned over the limbus and a portion of the sclera of the eye, said peripheral portion including an annular area having a radial width of from about 0.5 mm to about 2.0 mm adapted to be positioned over a portion of the sclera of the eye, said central, intermediate and peripheral portions each having a defined medial radius of curvature wherein the medial radius of curvature of said intermediate portion is greater that the medial radius of curvature of said central portion, the medial radius of curvature of said peripheral portion is greater than the medial radius of curvature of said intermediate portion, the medial radius of curvature of the intermediate portion of the posterior surface of the lends is greater that the medial radius of curvature of the predefined surface of the corneal portion circumscribing said lens of the eye, and when said lens is disposed on said eye a part of the intermediate portion of the posterior surface abuts a part of said predefined surface of the corneal portion circumscribing the lens with sufficient pressure to controllable alter the shape of the corneal surface in response to moving the eyelid over said lens.

10. A contact lens formed of a rigid gas permeable material and having a posterior surface and comprising a central portion adapted to optically aligned with the lens of an eye, an intermediate portion adapted to be positioned over the corneal portion of the eye circumscribing said lens of the eye, and a peripheral portion adapted to be positioned over the limbus and a portion of the sclera of the eye, said peripheral portion including a annular area having a radial width of from about 0.5 mm to about 2.0 mm adapted to be positioned over a portion of the sclera of the eye, said central, intermediate and peripheral portions each having a defined medial radius of curvature wherein the medial radius of curvature of said intermediate portion is greater than the medial radius of curvature of said central portion, the medial radius of curvature of said peripheral portion is greater than the medial radius of curvature of said intermediate portion and, the medial radius of curvature of the central portion of the posterior surface of the lens is greater that the medial radius of curvature of the predefined surface of the cornea covering the lens of the eye, and when said lens is disposed on said eye a part of the intermediate portion of the posterior surface abuts a part of said predefined surface of the cornea with sufficient pressure to controllable alter the shape of the corneal surface in response to moving the eyelid over said lens.

11. A method of providing optical correction for an eye subsequent to surgical treatment of a defined portion of the cornea of the eye, comprising:

disposing rigid, gas permeable, contact lens on said eye, said contact lens having an anterior surface, a central portion, an intermediate portion, and a peripheral portion, said central portion being adapted to be optically aligned with the lens of said eye and provide optical correction to light passing through said lens of the eye and having a posterior surface in abutment with the surface of a surgically untreated portion of the cornea, said intermediate portion being disposed in circumscribing relationship about said central portion and having a posterior surface spaced from the surface of said surgically treated portion of the cornea, and said peripheral portion being disposed in circumscribing relationship about said intermediate portion and having a posterior surface in abutment with a predetermined surface area of the sclera of the eye, said peripheral portion having a radial width of from about 0.5 mm to about 2.0 mm; and moving an eyelid of said eye over the anterior surface of said contact lens, wherein said posterior surfaces of the central and peripheral portions of said contact lens cooperate to controllably distribute the bearing pressure imposed on the surface of said surgically untreated portion of the cornea and the surface of the sclera said contact lens when said eyelid is moved over the anterior surface of the contact lens.

\* \* \* \* \*

UNITED STATES PATENT AND TRADEMARK OFFICE
CERTIFICATE OF CORRECTION

PATENT NO : 5,929,968
DATED : July 27, 1999
INVENTOR(S): Cotie, et al.

Page 1 of 2

It is certified that error appears in the above-identified patent and that said Letters Patent are hereby corrected as shown below:

| | |
|---|---|
| Column 8, line 21 | Replace "invention. is" With --invention, is-- |
| Column 10, line 17 | Replace "tube" With --the-- |
| Column 10, line 53 | Replace "claim 4" With --claim 3-- |
| Column 11, line 6 | Replace "portion," With --portion, and-- |
| Column 11, line 8 | Replace "lends" With --lens-- |
| Column 11, line 14 | Replace "controllable" With --controllably-- |
| Column 8, line 21 | Replace "a annular" With --an annular-- |
| Column 12, line 3 | Replace "controllable" With --controllably-- |

UNITED STATES PATENT AND TRADEMARK OFFICE
CERTIFICATE OF CORRECTION

PATENT NO : 5,929,968
DATED : July 27, 1999
INVENTOR(S): Cotie, et al.

It is certified that error appears in the above-identified patent and that said Letters Patent are hereby corrected as shown below:

Column 12, line 9    Replace "disposing rigid,"
With --disposing a rigid,--

Column 12, line 28    Replace "wherein"
With --whereby--

Column 12, line 32    Replace "sclera said"
With --sclera by said--

Signed and Sealed this

Twenty-fourth Day of April, 2001

Attest:

NICHOLAS P. GODICI

Attesting Officer    Acting Director of the United States Patent and Trademark Office